United States Patent Office 3,418,061
Patented Dec. 24, 1968

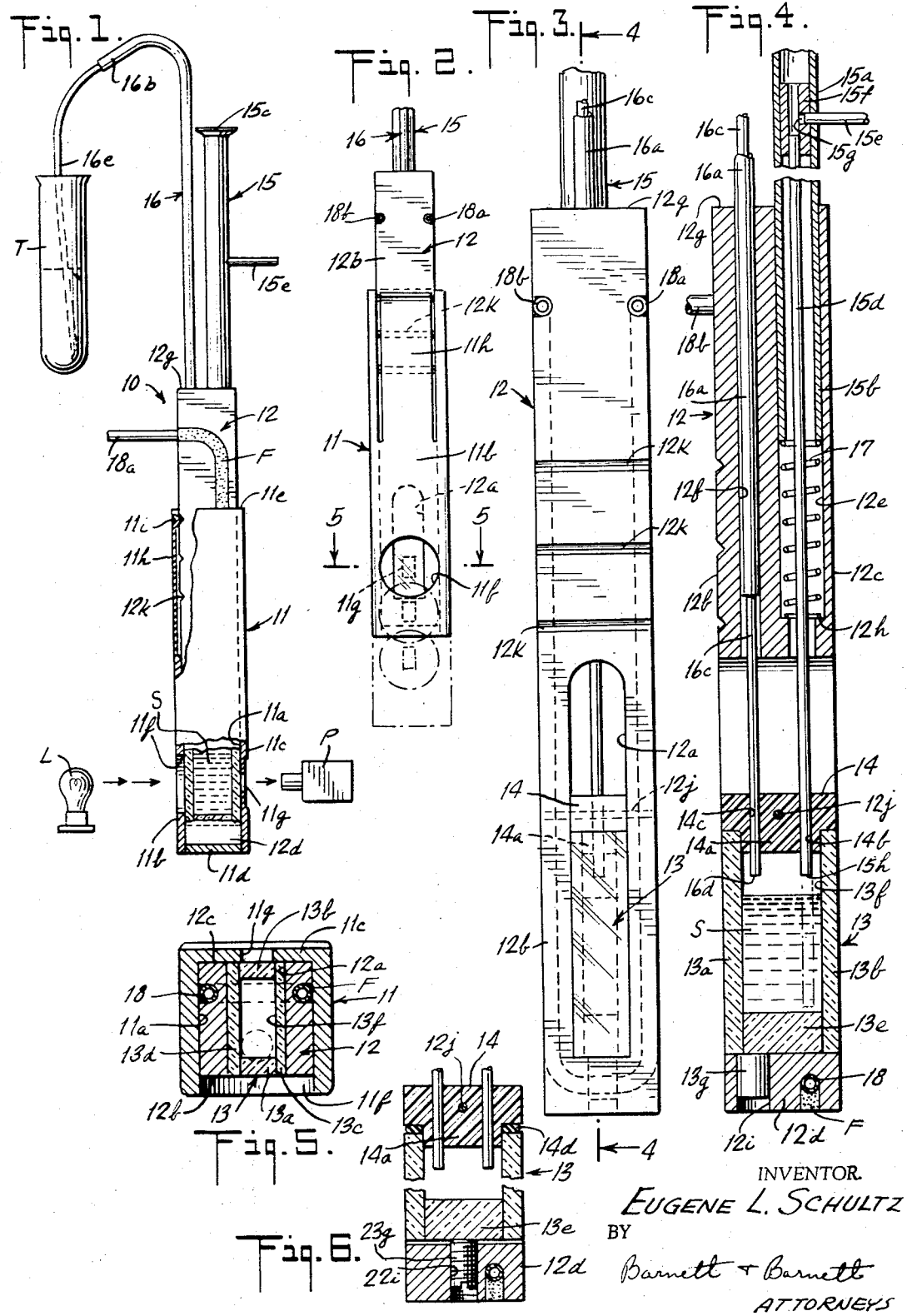

3,418,061
FLOW CELL CONSTRUCTION WITH DELIVERY
AND DISCHARGE MEANS
Eugene L. Schultz, Hollywood, Fla., assignor to Dade
Reagents, Inc., Miami, Fla., a corporation of Florida
Filed Dec. 30, 1963, Ser. No. 334,334
8 Claims. (Cl. 356—246)

ABSTRACT OF THE DISCLOSURE

A flow cell and adapter therefor in which the cell has an inlet tube for filling and an outlet tube for applying suction from a laboratory source by finger pressure to selectively fill and empty the cuvette and for cleaning and drying thereof. The cell incorporates a liquid circulating conduit for temperature control and is adjustably mountable by the adapter in conventional spectrophotometers for rapid change of position with respect to the instruments' light beam to effect calibration and sample testing.

---

This invention relates to spectrophotometers and more particularly is directed to flow cells for the liquid samples to be tested by the instrument and to such flow cells incorporating liquid sample delivery and discharge means adaptable for use in laboratory blood and urine analytical testing and other chemical micro-analysis.

Among the objects of the invention is to generally improve spectrophotometer flow cells by providing a unit incorporating liquid sample filling and emptying means which shall be capable of efficient and simple handling of small quantities of fluid samples, which shall utilize commonly available laboratory sources of vacuum or suction to effect both the filling and emptying operation, which shall incorporate liquid circulating means for temperature control, which shall comprise few and simple parts readily assembled into an operative unit, which shall be easy to flush clean and dry, which flow cell may be sized and shaped for use in a wide variety of spectrophotometers of different manufacturers presently in use by telescoping into a special adapter for each particular model spectrophotometer, which adapter shall also serve to selectively locate the flow cell with respect to the light beam for facilitating the calibration of the instrument scale at zero and 100 percent light intensity, and which shall be efficient and practical to a high degree in use.

Other objects of the invention will in part be obvious and in part hereinafter pointed out.

The invention accordingly consists of features of construction, combination of elements and arrangements of parts which will be exemplified in the construction hereinafter disclosed, the scope of the application of which will be indicated in the claims following.

In the accompanying drawing in which an illustrative embodiment of the invention is shown:

FIG. 1 is a side elevational view of a spectrophotometer flow cell and adapter therefor, constructed to embody the invention, removed from the instrument, a light source and photo cell of such instrument being diagrammatically indicated.

FIG. 2 is a fragmentary front elevational view of the flow cell and adapter shown in FIG. 1.

FIG. 3 is an enlarged front elevational view of the flow cell shown in FIG. 2 removed from the adapter.

FIG. 4 is a vertical sectional view taken on line 4—4 in FIG. 3 showing details of the construction of the flow cell.

FIG. 5 is a horizontal sectional view taken on line 5—5 in FIG. 2 showing details of the cuvette portion of the flow cell, and FIG. 6 is a fragmentary sectional view taken similar to FIG. 4 but showing a modified means for mounting the cuvette.

Referring in detail to the drawings, 10 denotes a spectrophotometer accessory comprising an adapter 11 and a flow cell 12, constructed to embody the invention, for presenting a liquid sample or liquid control to a spectrophotometer for analysis or comparison.

It is intended that an adapter 11 be provided of exterior size and configuration to fit the well of each different model instrument while the interior size and configuration of all adapters 11 be made uniform to receive a standardized flow cell 12.

Adapter 11, as seen in FIGS. 1, 2 and 5, is formed as a tubular body having an interior bore 11a preferably of square cross-section to telescopingly receive flow cell 12. Although adapter 11 is here shown as likewise having an exterior configuration square in cross-section to provide a front wall 11b, an opposite rear wall 11c, a bottom wall 11d and an open top end 11e, it is understood that the exterior configuration may be circular or any other desired shape to conform to the well of the spectrophotometer in which it is to be used. Opposite aligned windows providing a light beam passageway through adapter 11 adjacent bottom wall 11d are here shown as a relatively large opening 11f in front wall 11b and a slit-like window 11g of predetermined size and shape in rear wall 11c.

Flow cell 12 is shown in FIGS. 3, 4 and 5 as comprising an elongated vertical block structure made of brass or other suitable non-corrosive metal having a slot 12a extending therethrough from front side 12b to rear side 12c with one end adjacent the bottom of the cell 12 forming a bottom wall 12d and an opposite end located at a midportion of cell 12. A pair of vertical passageways 12e and 12f are formed in the upper portion of cell 12 extending from the top surface 12g into slot 12a. Passageway 12e may be of relatively larger diameter than passageway 12f and have a constricted bottom forming a shoulder 12h.

A cuvette 13 of conventional design made of quartz is shown as having a vertical front wall 13a, an opposite rear wall 13b, vertical side walls 13c and 13d and a bottom wall 13e all fused together in the well understood manner to provide a sample receiving chamber 13f, front wall 13a and rear wall 13b being optically clear. Any suitable means may be provided to mount cuvette 13 in slot 12a so that bottom wall 13e abuts bottom wall 12d and front wall 13a and rear wall 13b are aligned with front side 12b and rear side 12c, respectively. Such mounting means is shown to include a slug 13g which is cemented to the bottom of cuvette 13 to register with an opening 12i in bottom wall 12d and a pin 12j extending through the side walls of slot 12a and cap 14.

Cap 14 may be made of any suitable corrosion resistant material, preferably Teflon, and may be formed with a plug portion 14a sized to enter the upper open end of chamber 13f to effect a relatively air tight seal. A pair of openings 14b and 14c are formed in cap 14 in axial alignment with passageways 12e and 12f, respectively.

A feature of the invention is the provision of a simplified means for filling, emptying, cleaning and drying chamber 13f of cuvette 13 with the aid of any vacuum or suction producing apparatus normally available in a laboratory, as for example, a simple aspirator. To this end outlet system 15 and inlet system 16 are mounted in passageways 12e and 12f, respectively. Outlet system 15 is seen in FIGS. 1 and 4 to include an outer tube 15a sized to telescopingly fit passageway 12e and having a lower end 15b engaging a compression spring 17 normally retaining tube 15a at a predetermined spaced distance above shoulder 12h, an upper open end of tube 15a being fitted with a concave flange 15c for seating a finger of the operator to close the aperture. An inner tube 15d is suitably mounted coaxially with outer tube 15a and communicates at an upper end thereof with an exterior conduit 15e extending through the wall of outer tube 15a at a spaced distance below flange 15c for connecting outlet system 15 to a suction source (not shown). As shown in FIG. 4 outer tube 15a, inner tube 15d and conduit 15e may be all made of stainless steel tubing with a sleeve 15f retaining tubes 15a and 15d in coaxial relation and having a lateral opening 15g receiving conduit 15e. When outlet system 15 is in the normal full line position shown in FIG. 4, inner tube 15d extends through opening 14b of cap 14 into chamber 13f of cuvette 13 and has an open lower end 15h terminating at a relatively short distance below plug 14a, tubes 15a and 15d being movable to a lowered or depressed position by application of finger pressure on flange 15c against the action of spring 17, bringing tube end 15h to just short of cuvette bottom 13e as indicated in broken lines in FIG. 4.

Inlet system 16 is fixed with respect to flow cell 12 providing a conduit from the exterior for filling chamber 13f with liquid sample S and for rinsing and drying chamber 13f and may be fashioned in any suitable manner. Inlet system 16 is shown as a relatively rigid tube 16a which may be made of stainless steel or the like with one end friction fit into passageway 12f and an opposite free end 16b bent in a downward direction. Tube 16a serves as a support for flexible tube 16c which extends through tube 16a and opening 14c in plug 14 into chamber 13f where open lower end 16d thereof terminates just below plug 14a. Tube 16c extends with its opposite end beyond tube end 16b to provide a flexible intake suction tube portion 16e. Tube 16c is made of a suitable plastic such as Teflon, which is chemically inert to the constituents of liquid samples S and presents a non-wetting surface making it easy to keep clean.

A separate liquid circulating means may be incorporated in flow cell 12 for cooling or otherwise controlling the temperature of the liquid samples S being tested. Such means may be in the form of a continuous tubing 18 of a suitable metal having heat conducting properties, such as, copper, brass, stainless steel and the like. Tubing 18 has opposite free ends 18a and 18b projecting from an upper portion of flow cell 12 readily accessible for attachment in the well understood manner to a suitable cooling liquid source (not shown) and is preferably embedded in the block structure of flow cell 12, as for example, in a continuous groove machined or otherwise formed to extend along opposite sides of the block and across bottom wall 12d. A suitable cementous filler F, such as an epoxy resin with a suspension of powdered metal, may be used to retain tubing 18 against the bottom of the groove and to provide a concealing flush closure for the groove.

A releasable positioning means for locating flow cell 12 in a plurality of predetermined positions with respect to window 11g of adapter 11 may be provided to facilitate calibrating the scale of the spectrophotometer at the zero and 100 percent levels of light intensity. Such means may be in the form of a detent 11h cut from the upper end of adapter front wall 11b and having a transverse rib 11i projecting into bore 11a selectively engaging three transverse grooves 12k spaced apart along front wall 12b of flow cell 12.

The operation of accessory 10 will now be apparent. Flow cell 12 constructed as hereinbefore described and shown in the drawing is telescoped into adapter 11 which is then inserted into the well of the spectrophotometer (not shown) and oriented so that front wall 11b faces a light source L and rear wall 11c faces a photosensing device P as indicated in FIG. 1. Calibration of the instrument may now be readily accomplished by moving flow cell 12 with respect to adapter 11 so that detent rib 11i snaps into the intermediate groove of grooves 12k. In this position, as will be clear from FIGS. 1 and 2, bottom wall 12d is aligned with window 11g cutting off all light to photosensing device P for zeroing the instrument. Flow cell 12 is then raised a notch so that detent rib 11i engages the lowermost groove of grooves 12k, positioning flow cell 12 entirely above and clearing window 11g as seen in FIG. 2, for setting the instrument at 100 percent, that is, maximum deflection. Flow cell 12 is then lowered to its normal operating position wherein detent rib 11i engages the uppermost groove of grooves 12k and cell bottom wall 12d rests on adapter bottom wall 11d, properly positioning cuvette chamber 13f in alignment with window 11g for passage of light beam therethrough from source L to photosensing device P.

With exterior conduit 15e of outlet system 15 attached to a suction or vacuum source and, where desired, ends 18a and 18b of liquid cooling tube 18 attached to a temperature controlled liquid circulating mechanism, flow cell 12 is ready for use. From FIGS. 1 and 4 it will now be clear, that the suction being continuously applied through conduit 15e is ineffective until the upper end opening of tube 15a is closed by placing a finger on flange 15c thereby applying the suction through inner tube 15d, chamber 13f and tube 16c to fill, through the latter, chamber 13f with liquid sample S from test tube T. A reading of the instrument will then be made and thereafter chamber 13f emptied by applying finger pressure to flange 15c, simultaneously closing the upper end opening of tube 15a and depressing the latter against compression spring 17 to bring inner tube open end 15h to its lowered position shown in broken lines in FIG. 4. Tube 15a is then released to return to its normal position and the operation repeated for the next sample to be tested. In this manner a series of samples may be tested in quick succession.

A modified means for mounting cuvette 13 in slot 12a, illustrated in FIG. 6, may comprise a threaded bore 22i in place of opening 12i to receive set screw 23g and an O-ring 14d fitted between cap 14 and the open end of cuvette 13. Thus, in assembling flow cell 12, after cuvette is positioned in slot 12a and cap 14 with O-ring 14d is mounted on the open end thereof and pin 12f inserted to secure cap 14 in position, set screw 23g may be tightened to raise cuvette 13 and compress O-ring 14d for proper sealing of chamber 13f.

It is thus seen that there is provided an improved flow cell construction with delivery and discharge means whereby the several objects of this invention are achieved and which is well adapted to meet the conditions of practical use.

As various possible embodiments might be made of the above invention, and as various changes might be made in the embodiments above set forth, it is to be understood that all matters herein set forth or shown in the accompanying drawing are to be interpreted as illustrative and not in a limiting sense.

Having thus described my invention, I claim as new and desire to secure by Letters Patent:

1. A flow cell for spectrophotometers comprising a chamber for receiving liquid samples for presentation to the spectrophotometer, said chamber having a bottom and a top closure cap, an inlet and outlet system having inlet and outlet conduits, respectively, extending through said closure cap, each conduit terminating in a first opening within said chamber, said closure cap otherwise sealing off said chamber from the atmosphere, said outlet system having a second opening communicating with said outlet conduit closable by finger pressure and an intermediate conduit connection to a constant suction source, said suction being selectively applicable to the chamber through said outlet conduit by finger pressure closing of said second opening, said outlet conduit first opening being normally positioned at a predetermined distance above said chamber bottom, said outlet system including means mounting said outlet conduit for movement of the first opening from said normal position to a second position adjacent said chamber bottom by application of additional finger pressure on said second opening, said inlet system having a conduit extension communicating with said inlet conduit adapted for insertion into an open top receptacle containing a liquid sample for delivery into said chamber when suction is applied to the chamber by said finger pressure closure of said outlet conduit second opening.

2. A flow cell telescopingly supported by an adapter fitted to a well of a spectrophotometer, the latter having a light beam directed across the well in a predetermined path from a light source to a photosensitive device, said flow cell having a chamber for receiving liquid samples for presentation to the spectrophotometer, said chamber having aligned front and rear light transmitting walls for passage of said light beam therethrough, said flow cell having an opaque portion adjacent said chamber walls and means for filling said chamber with said liquid samples and for emptying same, said adapter having a window located in the path of said light beam sized to limit the effective cross-sectional area of the beam to correspond to a predetermined area of each of said chamber walls, and means for selectively positioning said flow cell within the adapter in a first position with said opaque portion in registered alignment with said window to completely obstruct the light beam from a zero calibration, in a second position for an unobstructed light beam path through said window for a 100 percent calibration and in a third position with the predetermined areas of said chamber walls in registered alignment with said window for passage of the light beam through the chamber for a colorimetric measurement of the liquid sample.

3. A flow cell for spectrophotometers comprising a vertically elongated block having a slot extending transversely from a front side to a rear side and vertically from a bottom wall to a midportion thereof, a pair of spaced vertical passageways in said block extending from a top surface thereof to communicate with said slot, a cuvette positioned in said slot having an open top chamber formed with a bottom wall facing said block bottom wall, a cap closure for said cuvette chamber having a pair of openings, an inlet tube extending through one of said vertical passageways and one of said cap openings into said chamber, an outlet tube extending through the other of said vertical passageways and other of said cap openings into said chamber and having an end opening normally positioned a predetermined distance above said cuvette bottom wall, an opposite end of said outlet tube extending above said block having an opening closable by finger pressure, an intermediate conduit connection to said outlet tube for application of a constant suction thereto, said suction being selectively applicable to the chamber through said outlet tube by finger pressure closing of said opposite end opening, means mounting said outlet tube in said vertical passageway for sliding movement therethrough to selectively move the outlet tube end from said normal position to a second position adjacent said chamber bottom by application of additional finger pressure on said opposite end, said inlet tube having an extension beyond said block top adapted for insertion into an open top receptacle containing a liquid sample for delivery into said chamber when suction is applied to the chamber by said finger pressure closure of said outlet tube opposite end opening.

4. The flow cell defined in claim 3 in which said block is formed of a heat conducting material and has passageways extending therethrough along two opposite sides and the bottom of said cuvette for circulating a temperature controlling fluid to maintain said cuvette in a predetermined temperature range.

5. The flow cell defined in claim 3 in which said cuvette is formed of fused quartz and is retained in position in said slot by a slug adhesively secured to said cuvette bottom wall engaging a registering opening in said block bottom wall, and by a pin extending through the walls of said slot and said cap closure the latter having a plug portion seated in said cuvette chamber.

6. The flow cell defined in claim 3 in which said block is formed of a heat conducting material, a fluid circulating means incorporated in said block for controlling the temperature of the cuvette chamber comprising a continuous groove formed in opposite side walls and across the bottom wall of said block, a tubing of heat conducting material positioned in said groove and having opposite free ends extending beyond the block in an upper end region thereof for attachment to a temperature controlled fluid source, and means for retaining said tubing in said groove.

7. The flow cell defined in claim 3 in which said cuvette is formed of fused quartz and has an O-ring fitted between said cap closure and open top, a pin extending through the walls of said slot and cap closure mounting the latter therebetween, and a set screw mounted in said block bottom wall engaging the cuvette bottom wall for urging the cuvette against the O-ring and cap closure to effect a substantially suction proof closure for the cuvette.

8. The flow cell and adapter defined in claim 2 in which said flow cell is a first part and said adapter is a second part, said means for selectively positioning the flow cell within the adapter including a spring actuated detent mounted on one of said parts for selectively engaging a plurality of spaced grooves formed on the other part.

References Cited

UNITED STATES PATENTS

| | | | |
|---|---|---|---|
| 2,596,560 | 5/1952 | Johnson | 73—425.6 |
| 2,878,715 | 3/1959 | Rhees | 88—14 |
| 3,097,928 | 7/1963 | Staunton | 88—14 |
| 3,225,601 | 12/1965 | Shrewsbury | 88—14 |
| 2,139,114 | 12/1938 | Demers | 73—425.6 X |

JEWELL H. PEDERSEN, *Primary Examiner.*

O. B. CHEW, *Assistant Examiner.*